United States Patent [19]
Bumueller

[11] 3,977,636
[45] Aug. 31, 1976

[54] TURNTABLE

[76] Inventor: Hermann Karl Bumueller, 95 Dequire Blvd., Montreal, Quebec, Canada

[22] Filed: July 10, 1974

[21] Appl. No.: 487,160

Related U.S. Application Data

[63] Continuation-in-part of Ser. No. 271,052, July 12, 1972, Pat. No. 3,823,902.

[52] U.S. Cl. ............................ 248/2; 180/79.5; 188/170
[51] Int. Cl.² ........................................ A47B 21/00
[58] Field of Search .......... 248/2, 16; 188/170, 188/76, 110; 180/79.5, 6.56, 6.6; 173/28, 27, 43

[56] References Cited
UNITED STATES PATENTS

| 1,083,681 | 1/1914 | Harris | 180/79.5 |
|---|---|---|---|
| 1,629,521 | 5/1927 | Moore | 180/79.5 |
| 2,284,484 | 5/1942 | Eksergian | 248/2 |
| 2,855,110 | 10/1958 | Prichard | 180/6.58 |
| 3,648,956 | 3/1972 | Paulson et al. | 248/2 |
| 3,688,877 | 9/1972 | Day | 188/170 |
| 3,743,061 | 7/1973 | Brown | 180/170 |
| 3,847,254 | 11/1974 | Gardner | 188/170 |

*Primary Examiner*—James T. McCall
*Assistant Examiner*—Robert A. Hafer

[57] ABSTRACT

A turntable unit particularly suitable for mounting a construction assembly on a vehicle, for example, a rock drill comprising a first stationary non-rotatable member and a second member rotatably mounted on said first member, means to rotate said second member on said first member and braking means mounted on one of said first member and said second member adapted to engage the other of said first member and said second member.

12 Claims, 2 Drawing Figures

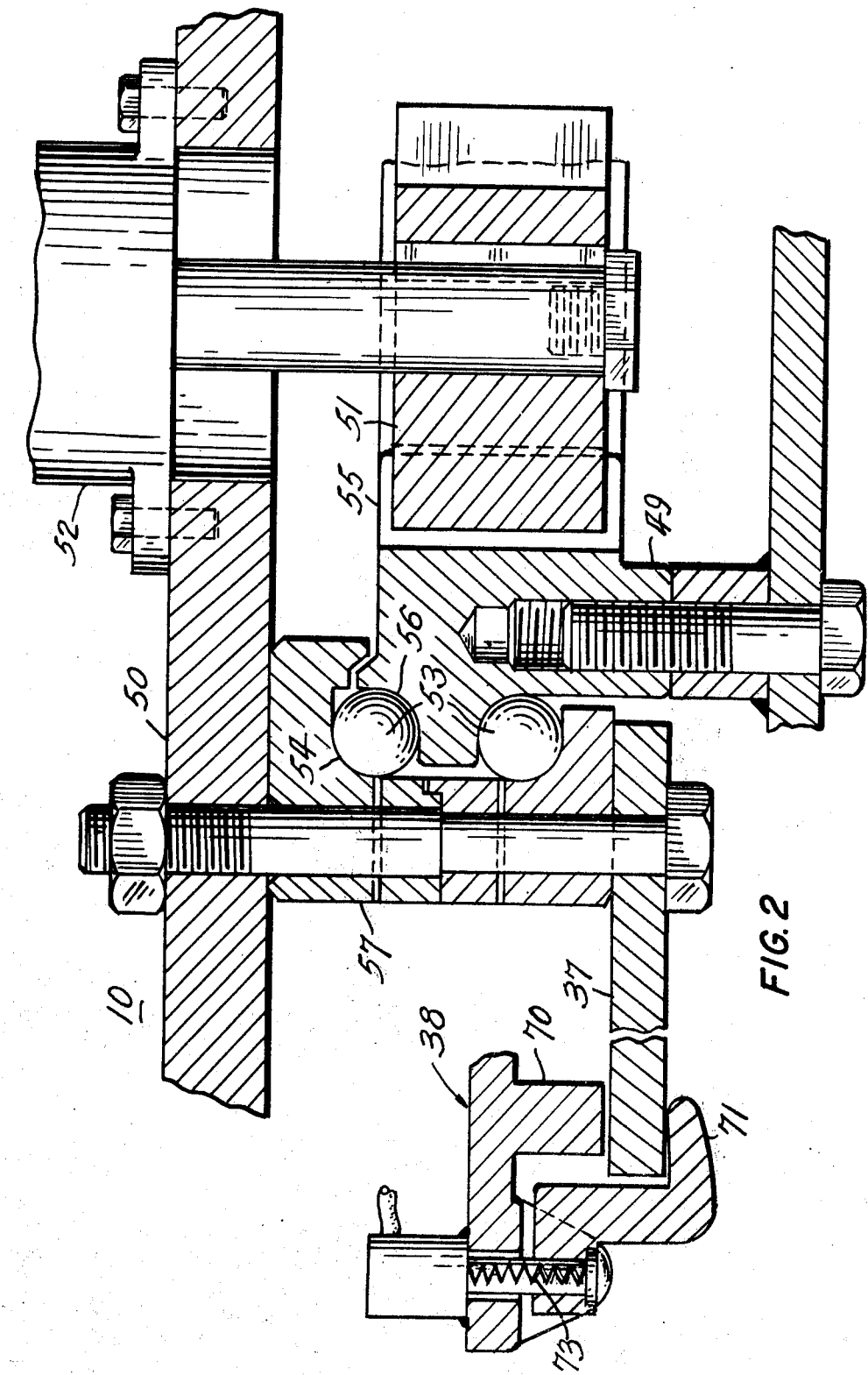

TURNTABLE

CROSS-REFERENCE TO RELATED APPLICATIONS

This application is a Continuation-in-part of application Ser. No. 271,052 filed July 12, 1972, now U.S. Pat. No. 3,823,902.

BACKGROUND OF THE INVENTION a. Field of the Invention

This invention relates to a turntable unit and more especially to a turntable unit adapted to support construction equipment, for example, a drilling assembly.

b. Description of Prior Art

In order to carry out operations in outlying areas in which a varied terrain is encountered such as in mining and road making, construction assemblies are mounted on a vehicle which must be capable of travelling over the varied terrain. Vehicles which will meet the arduous requirements in one respect have frequently failed in other respects. Generally, the vehicles which are used to mount working assemblies are of the track type being mounted on caterpillar tracks and are large in size and heavy in weight.

An example of such a construction assembly is a rock drill used for boring holes. Such rock drills may include a pneumatic drill mounted on a guide rail which is supported on a rotatable boom assembly; the boom assembly being mounted on the vehicle.

Suitably the boom assembly may be mounted on a rotatable turntable on the vehicle to allow the operator to select a plurality of directions for feeding the drill to the work area. The turntable may also support a cabin for the operator.

The turntable has to be a rugged component to support the heavy load of the drill assembly or other construction assembly and the operator's cabin; and also to withstand the continuous vibrations which occur in operation. The turntable is therefore generally a massive component.

In view of the nature of the construction equipment mounted on the turntable and so that the operator may operate the vehicle safely and drive it from place to place it is desirable to avoid free rotation of the turntable with its mounted components when the vehicle is travelling or working.

In conventional systems the braking action of the gears through which the turntable is driven has been used to prevent free rotation. However, while the free rotation is largely avoided in this way there is still some free play or slack in view of the rugged, unsophisticated gear assemblies used; the resulting small movements of the turntable result in wear on the gears.

SUMMARY OF THE INVENTION

It is an object of the present invention to provide an improved turntable unit adapted to mount a construction assembly on a vehicle.

The invention thus provides a turntable unit comprising a first stationary non-rotatable member, a second member rotatably mounted on said first member; said second member including a supporting platform adapted to support a construction assembly; means to rotate said second member, and braking means mounted on one of said first and second members adapted to engage an arcuate friction surface at the periphery of the other of said first and second members.

In one embodiment of the invention the second member includes a disc shaped supporting platform on which is mounted a construction assembly and an operator's cabin and the platform includes a downwardly extending skirt having a flange extending radially outwardly from its periphery; and the braking means comprises a plurality of braking devices located circumferentially about the platform and adapted to engage the flange.

In a preferred embodiment, the construction assembly is in the form of a boom arrangement with at least one drill assembly.

BRIEF DESCRIPTION OF DRAWINGS

Preferred embodiments of the invention are illustrated with reference to the accompanying drawings, in which:

FIG. 2 is a fragmentary vertical cross section of the novel turntable unit.

DESCRIPTION OF PREFERRED EMBODIMENTS

Figure 1:
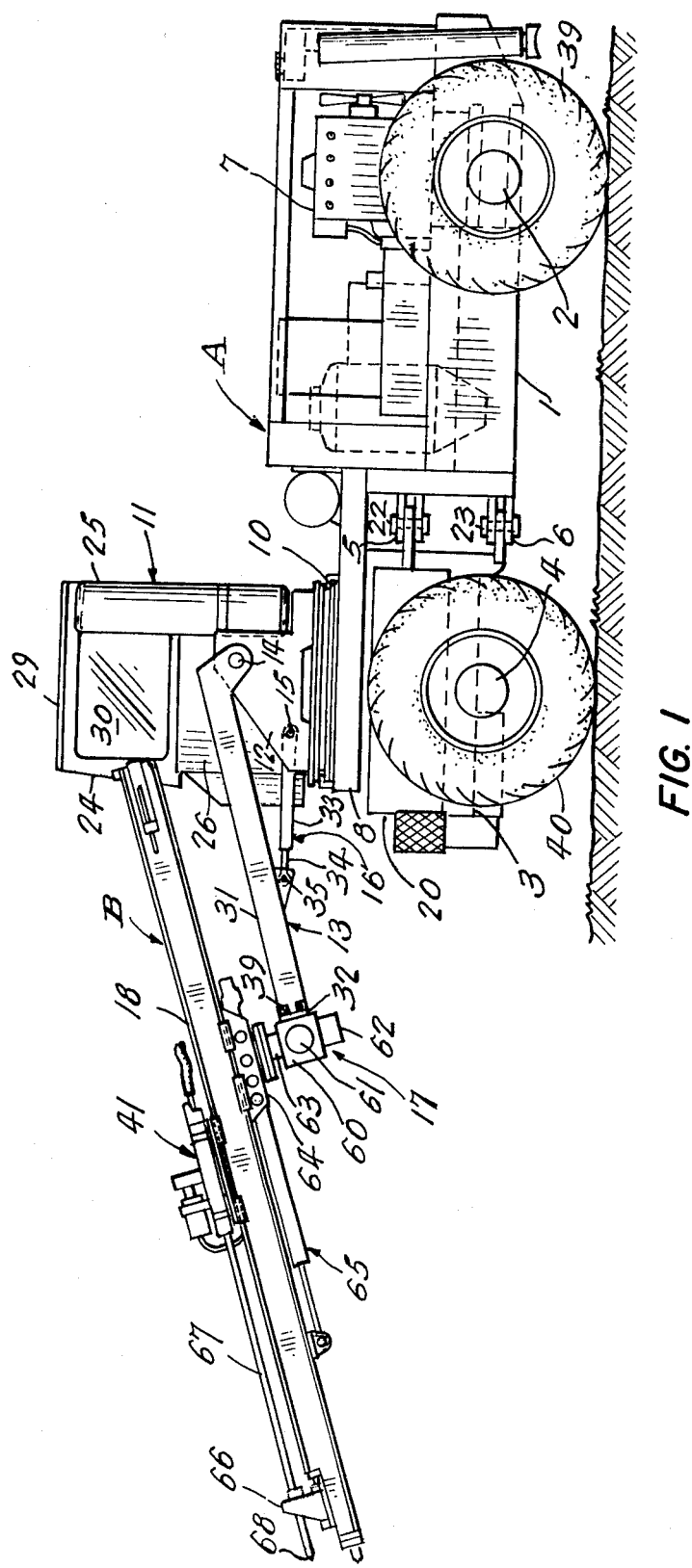
FIG. 1 is a side elevation illustrating a vehicle in an operative position incorporating the novel turntable unit.

While the novel turntable unit can be employed in a variety of environments, the particular embodiment described in the present application is a vehicle mounting a rock drill generally shown in FIG. 1 wherein there is illustrated a vehicle A having a drill assembly B.

The vehicle A includes frames 1 and 3 mounted on axles 2 and 4 respectively, the frames 1 and 3 being articulated at articulation points 5 and 6 by means of articulation pins 22 and 23. Pairs of wheels 39 and 40 are rotatably mounted on axles 2 and 4 respectively. An engine 7 and transmission unit 43 are mounted on the frame 1, and are adapted to drive the vehicle A. A compressor 21 the use of which is described below is also mounted on frame 1, and is adapted to be driven by the engine 7.

The frame 3 has a large capacity fuel tank 20 mounted on it.

A platform 8 is mounted on and extends cantileverwise from the frame 1 over frame 3, and a turntable unit 10 is rotatably mounted on platform 8.

A cabin 11 for an operator is mounted on the turntable unit 10 and includes front and rear walls 24 and 25 respectively, side walls 26 and 27 and a roof 29. The front and rear walls 24 and 25 and side walls 26 and 27 have windows 30 to provide the operator with a clear, all-round view.

A pivot bracket 12 is mounted on the turntable 10 adjacent sidewall 26 of the cabin 11. The drill assembly B includes a telescopic boom 13 having boom sections 31 and 32. Boom section 31 is hingedly mounted to pivot pin 14 in the bracket 12. The boom section 32 slides within the boom section 31 on interchangeable bearing pads 39, preferably made from conventional brake lining material, for example, asbestos.

A hydraulic lift cylinder arrangement 16 is provided including a cylinder 33 hinged to the bracket 12 by means of hinge pin 15, and a piston 34 connected to the boom section 31 by means of hinge pin 35.

At the free end of the boom section 32, there is provided a universal joint indicated generally at 17, which includes a first fixed bracket 60 in a second bracket 69 rotatable relative to the fixed bracket 60. A hydraulic actuator 61 mounted to the fixed bracket 60 drives the second bracket 69 relative thereto. A second hydraulic actuator 62 is mounted to the second bracket 69 and drives a shaft 63 journalled in the second bracket 69. A drill beam 18 including a mounting bracket 64 is fixedly mounted to the shaft 63 driven by the second hydraulic actuator 62. The drill beam 18 slides relative to the mounting bracket 64, and a piston and cylinder arrangement 65 connects at one end to the mounting bracket 64, and the other end to the drill beam 18. Finally a typical pneumatic drill motor 41 is adapted to slide on the drill beam 18 in the conventional manner. A drill rod holder 66 is provided at the end of the drill beam 18. In the drawings, a drill rod 67 and bit 68 is shown in an operative position. The drilling beam 18 further includes a roller chain, having a chain tensioner; the roller chain draws a feed cradle carrying drill rod 67.

When piston 34 is retracted, i.e. the lift cylinder arrangement 16 is in unextended position, the telescopic boom 13 is in a lower working position, and is inclined at an angle of about 25° below the horizontal. When piston 34 is extended, the telescopic boom 13 is in its upper working position, and is inclined at an angle of about 30° above the horizontal. The telescopic boom 13 can occupy any position between these upper and lower positions.

The drill bit 68 can be turned through an angle of up to about 280° in any horizontal or vertical plane in which it is set by the starting position of the turntable 10 and telescopic boom 13 by means of the universal joint 17.

The interior of cabin 11 is arranged such that the controls for driving the vehicle A are located alongside rear wall 25, and the controls for operating the drill assembly B are located alongside front wall 24. The cabin 11 contains a swivel chair (not shown) located between front and rear walls 24 and 25. Thus when an operator is operating the drill assembly B he sits facing front wall 24 with the appropriate controls in front of him, at the same time, he has a clear view of the drill assembly B through the window 30 in front wall 24.

If the operator wants to drive the vehicle or to move it forwards or rearwards he turns his chair to the driving controls alongside rear wall 25; in this position he has a clear view in front of him through the window 30 in rear wall 25, and by means of suitably placed mirrors can see behind him.

The turntable unit 10 is mounted for rotary movement up to 360°. Thus, when the drill assembly B is not in use, as for example, when the vehicle A is en route to a working site, the turntable unit 10 can be rotated, so that the drill assembly B overlies frame 1. This results in a compact arrangement which can be manoeuvered in areas in which manoeuvering of the vehicle A with the drill assembly B in the extended position would be difficult. The vehicle A thus can adapt a compact form for travelling and has good manoeuverability.

With reference to FIG. 2 a turntable unit 10 is illustrated which includes an annular stationary non-rotatable support member 49 having an inwardly-facing gear ring 55. A rotatable member 50, rotatable relative to the stationary support 49 includes a downwardly extending annular skirt 57 forming the outer race 54 of a double ball bearing arrangement while the annular stationary support member 49 forms the inner race 56 of the ball bearing arrangement. The annular skirt 57 of the rotatable member 50 includes an outwardly extending annular flange 37. A hydraulic motor 52 is mounted on and extends through the rotatable member 50 and mounts a pinion gear 51, which engages the gear ring 55 in stationary member 49.

A plurality of spring loaded disc brakes 38 connected to a hydraulic cylinder (not shown) are mounted around turntable 10 on platform 8. Brake members such as 70 and 71 under the action of the springs 73 engage the flange 37 of member 50, and their braking action thus holds the turntable 10 in the desired position. When it is desired to rotate the turntable 10, the pressure of the springs 73 is opposed by hydraulic pressure from the hydraulic cylinder, and the brakes are released, thus enabling the turntable 10 to be rotated.

The brake members exemplified by 70 and 71 and the flange 37 are suitably lined with a brake lining material for example, asbestos, at their engaging surfaces.

Suitably the member 50 is generally disc shaped and the disc brakes 38 are located circumferentially at regular spaced intervals around it.

It will be appreciated that the disc brakes 38 could also be mounted on the rotatable member 50 and adapted to engage the stationary member.

This braking system has advantages over conventional braking systems in which the braking action is controlled through the gears, since the possibility of free play or slack, which may occur when the braking action is through the gears can be avoided; further a smaller retarding force is required to brake the turntable unit at its perimeter than is needed at the centre when the gears are used.

The braking system has the further advantage that it stabilizes the location of the drill assembly B and the vibrations developed, for example, in the operation of the drill assembly B have only a limited effect on the direction and accuracy of the drilling.

In a particular embodiment a vehicle A, according to the invention, having a drill assembly B has a GM-6V-71 diesel engine 7 and a 600 c.f.m. Atlas Copco DT4 two stage air cooled compressor 21. The telescopic boom 13 has a retracted boom length of about 9 feet, and an extended boom length of about 14 feet.

The overall length of vehicle A was of the order of 18 ft., 9 ins., the overall width about 8 ft., 6 ins. and the overall height with cabin 11 of the order of 11 ft., the ground clearance was about 1 ft., 7 ins., and the wheel base was about 11 ft., 6 ins.

The wheels 39, 40 had 18.00 to 26 inch, 10 ply tube type sure grip Grader-2 tires for maximum two-way, non-skid traction.

The weight of the vehicle was of the order of 32,000 lbs.

These dimensions illustrate the relative compactness of the vehicle as compared with those typically used in drilling and related operations.

The drilling beam 18 had a total length of about 18 ft., 6 ins., and the extension cylinder provided an extension of 3 ft.

The drill bit 68 was of the Atlas Copco Rock Drill Model BBE 37, and the chain feed was a Standard Atlas Copco BBM36K258. Air consumption for operation of the drill bit 68 is generally about 630 cu. ft./min.

The fuel tank 20 had a capacity of about 289 U.S. gallons, which can thus hold enough fuel for about one week based on an 8 hour working day, and avoids the necessity for separate fuel carrying trailers.

In operation the drill bit 68 can be located initially at the required working area by rotating the turntable unit 10 and holding the turntable 10 by means of brakes 38 when the drill bit 68 is pointing approximately in the direction of the working area. The telescopic boom 13 is then adjusted to an appropriate angle by the lift cylinder arrangement 16, and the telescopic boom 13 extended towards the working area as necessary. A range of working areas can then be reached by adjustment of the universal joint 17 without the necessity of further adjustment to the turntable 10 or the position of the telescopic boom 13.

In another embodiment a second drilling assembly B could be mounted on turntable unit 10 adjacent side wall 27 of the cabin 11; this would enable two drilling operations to be carried out at the same time.

I claim:

1. A turntable unit comprising a stationary nonrotatably first member, a second member, mounting means rotatably mounting said second member on said first member, said second member including a supporting platform adapted to support a construction assembly; drive means for rotating said second member on said first member, a flat circular friction surface at a periphery of one of said members, braking means separate and apart from said drive means mounted on the other of said members for engaging said flat circular friction surface for holding said second member stationary relative to said first member, said first member defines the inner race of a double ballbearing arrangement and the second member is disc-shaped with a downwardly extending annular skirt defining the outer race of said double ballbearing arrangement; said first member having an inwardly facing gear ring engaging a pinion gear on a shaft mounted for rotation with said second member and driven by a motor mounted on said second member; a flange extending radially outwardly from said annular skirt and a plurality of spring loaded disc brakes mounted on said first member at spaced intervals around said second member adapted to engage said flange.

2. A unit according to claim 1 having a construction assembly and an operator control cabin mounted on said second member.

3. A unit according to claim 2 wherein said construction assembly is a rock drill assembly.

4. A unit according to claim 1 wherein said supporting platform is disc-shaped and has a flange adjacent its periphery, and said braking means being mounted on said first member and being adapted to engage said flange.

5. A unit according to claim 1 wherein said braking means comprises a plurality of spring loaded hydraulically operated disc brakes located at spaced intervals around said second member.

6. A unit according to claim 1, mounted on a vehicle.

7. A turntable unit comprising a stationary non-rotatable first member, a second member, mounting means rotatably mounting said second member on said first member, said second member including a supporting platform adapted to support a construction assembly; drive means for rotating said second member on said first member, a flat circular friction surface at a periphery of one of said members, braking means separate and apart from said drive means mounted on the other of said members for engaging said flat circular friction surface for holding said second member stationary relative to said first member, said drive means including a ring gear fixedly carried by one of said members, a drive unit carried by the other of said members, a pinion gear carried by said drive unit drivingly engaging said ring gear, said ring gear being an internal gear; said mounting means including said ring gear having an external surface configured to define a pair of spaced first raceways, said other member including an annular skirt generally surrounding said ring gear and having second raceways opposing said first raceways, and compliments of rolling elements disposed between said raceways.

8. A unit according to claim 7 wherein said skirt member is a split construction, a fastening means securing together said skirt member and securing said skirt member to another part of said other member.

9. A unit according to claim 7 wherein said flat circular friction surface is secured to the underside of said skirt member.

10. A unit according to claim 7 wherein said supporting platform is disc-shaped and has a flange adjacent its periphery, and said braking means being mounted on said first member and being adapted to engage said flange.

11. A unit according to claim 7 wherein said braking means comprises a plurality of spring loaded hydraulically operated disc brakes located at spaced intervals around said second member.

12. A unit according to claim 7, mounted on a vehicle.

* * * * *